United States Patent [19]

Raphaël

[11] Patent Number: 4,916,298

[45] Date of Patent: Apr. 10, 1990

[54] METHOD FOR THE OPTICAL READING OF BAR CODES

[75] Inventor: Moreno Raphaël, Marseilles, France

[73] Assignee: SGS-Thomson Microelectronics SA, Gentilly, France

[21] Appl. No.: 265,230

[22] Filed: Oct. 31, 1988

[30] Foreign Application Priority Data

Nov. 6, 1987 [FR] France ................................ 87 15403

[51] Int. Cl.$^4$ .............................................. G06K 7/10
[52] U.S. Cl. ..................................... 235/463; 235/470
[58] Field of Search ................................ 235/463, 470

[56] References Cited

U.S. PATENT DOCUMENTS 4,147,295  4/1979  Nojiri .................................... 235/463
4,675,909  8/1985  Egami et al. .

FOREIGN PATENT DOCUMENTS 0036951  4/1982  European Pat. Off. .
2435092  3/1981  France .

OTHER PUBLICATIONS

IBM Technical Disclosure Bulletin–Apr. 1983, vol. 25.

Primary Examiner—Harold I. Pitts
Attorney, Agent, or Firm—Roland Plottel

[57] ABSTRACT

Disclosed is an improvement in methods for reading bar codes, enabling the codes to be read even under difficult conditions of uneven printing, stained background, poor contrast, cut bars etc. Instead of merely detecting light absorption or reflection spikes when a detector is moved in front of the code, where the presence of a bar is indicated when a threshold is exceeded, the following method is used: a matrix image of black and white pixels is set up; the sum Tj of black pixels of each column is counted to draw up a curve Tj as a function of the abscissa j of columns; a threshold SDA is established for Tj, below which, in principle, the columns do not contain a portion of a bar code bar; blocks of columns going beyond the threshold SDA are demarcated, and all the other columns of the image are eliminated; then shape recognition is carried out on the remaining blocks to ascertain whether the block truly corresponds to a bar or not. The value SDA is established by a recurrent computation that brings into play the ratio between surfaces Sinf and Ssup, above and below the threshold SDA in the curve $Tj = f(j)$.

8 Claims, 2 Drawing Sheets

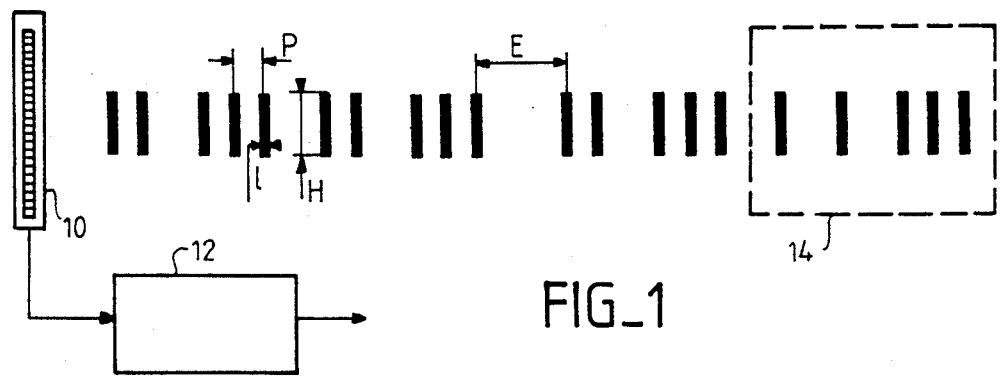
FIG_1
FIG_2
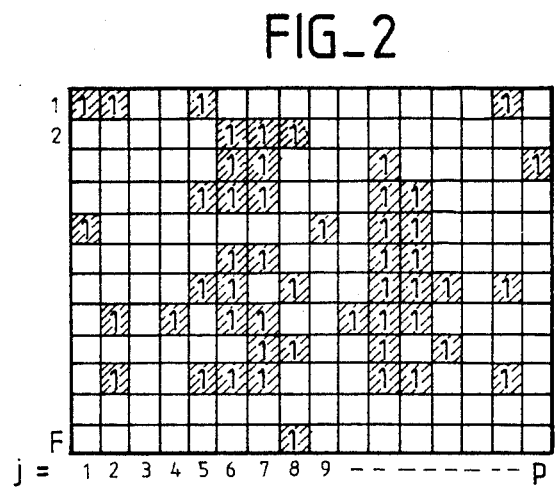
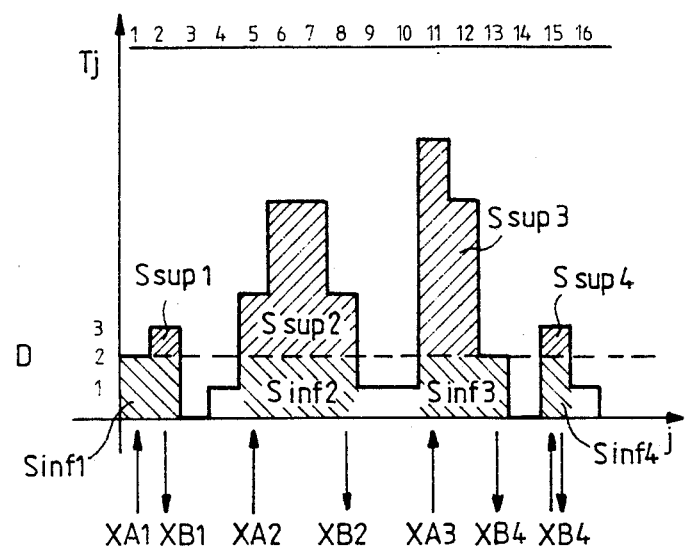

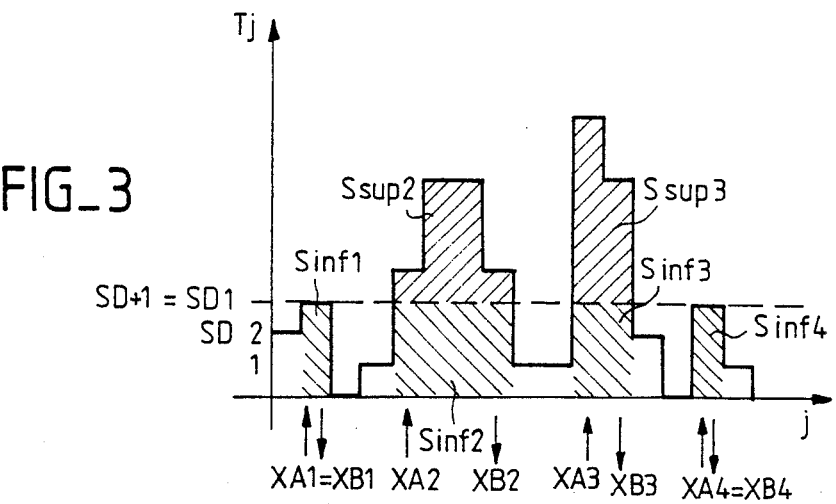
FIG_3
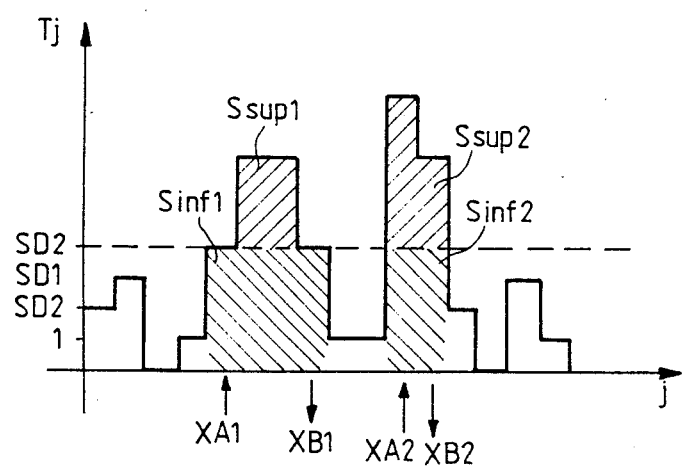
FIG_4
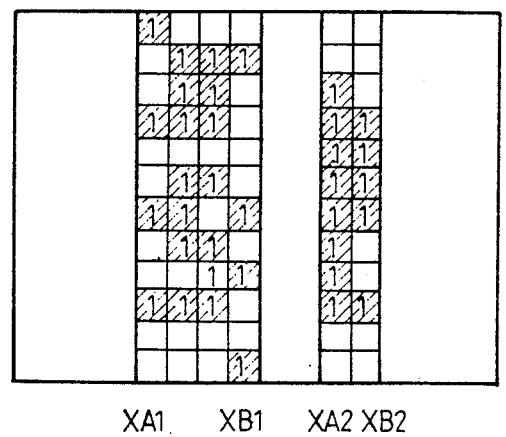
FIG_5

METHOD FOR THE OPTICAL READING OF BAR CODES

BACKGROUND OF THE INVENTION

1. Field of the Invention

The invention concerns the optical reading of indexing marks and, more precisely, of bar codes placed on labels or, more generally, on documents or on any object with a substantially flat surface.

2. Description of the Prior Art

Indexing marks are used for the recognition of objects in order to make it easier to manage them. They are commonly used, for example, to indicate references or prices of goods. Rather than recording solely references that are clearly readable by an observer, it is attempted also (or instead) to place codes that can be easily recognized by optical detectors. The automation of certain operations may be greatly facilitated thereby. For example, a cashier in a shop will work faster by placing an optical pencil on an indexing mark on an article, than by reading the price and reference and typing them on the keyboard of a cash register.

Bar codes are marks which lend themselves particularly well to automated optical reading. They consist of rectangular strips or bars, the width and/or spacing of which is used to encode the useful information. For example, when this information, as is very frequently the case, is a sequence of decimal figures, the corresponding mark will be formed by a sequence of parallel strips with a width s.1 where 1 is the width of the narrowest strips and s is a whole number of a few units at the most, the spacing of the strips being m.e where e is the narrowest nominal space between strips and m is a whole number of a few units.

The code may also be limited to a variable spacing of strips of constant width or, on the contrary, to a variable width of strips spaced out at a constant distance.

In all cases, the reading of the bar code requires the recognition of the presence of bars, even in the presence of noise, for example, in the presence of black spots mixed with the black bars printed on a white background.

In the present invention, we shall not be concerned with decoding as such (i.e. the conversion of widths and/or spacings into a sequence of decimal figures for example) but only with the recognition of the presence of bars.

The precision of recognition depends on the marking quality and on the background against which it is placed. The bars should be printed very sharply with a sharp luminous contrast with respect to the background. The precision is also a function of the quality of optical detector used.

Special care should be attached to he marking quality if the detector is of a basic type. Certain detectors are capable only of differentiating between highly absorptive zones (very black ink for example) and a highly reflective background (white paper background for example) and again, of doing so on condition that the zones are very sharply demarcated.

In certain cases, there is so little certainty of the quality of the background on which the marks are made, because various recordings or spots are superimposed on the indexing mark that special inks are used, reflecting only one wavelength, along with optical detectors that work selectively at this wavelength: this complicates the manufacturing process and increases the cost of systems.

An object of the invention is a method for reading bar codes which can be used to recognize and decode marks even when they are imperfect or when they are placed on surfaces of poor quality. This enables simplifying the marking methods by permitting the use of ordinary printers insteads of expensive printing processes.

On the whole, standard methods for reading bar codes consist simply in making an optical detector move past the code (or conversely) at a constant speed, crosswise to the direction in which the strips are extended, in observing the existence of successive spikes of the output signal of the detector, said spikes corresponding to maximum values of absorption, transmission or reflection of light, and in comparing these peaks with predefined thresholds, to deduce therefrom the presence or absence of strips (and then their width or their spacing).

The invention proposes a far more sophisticated method used to take into account damage in marking such as breaks in bars, poor contrast, unwanted spots, uneven printing, etc.

SUMMARY OF THE INVENTION

To this end, the invention propose the performance of the following sequence of processing operations:

(a) providing, by means of an optical detector, a depiction of a zone containing bars of a bar code, in the form of a matrix of pixels in which each pixel represents a binary logic state characteristic of a dot of the zone;

(b) computing the total $T_j$ of the number of pixels in a first logic state for each column of the matrix, j being the column index of the matrix;

(c) establishing a value SDA such that the columns for which $T_j$ is below SDA are not considered as probably containing a bar of the bar code;

(d) determining, by making j increase, a sequence of abscissae of columns $XA_1$, $XA_2$, . . ., $XA_r$ etc., for which $T_j$ crosses the value SDA in a first direction and a sequence of abscissae of columns $XB_1$, $XB_2$, . . . $XB_R$, etc. for which $T_j$ crosses the value SDA in the other direction;

(e) demarcating, in the matrix of pixels, for each index r, a rectangle having, as its sides, the columns of abscissae $XA_r$, $XB_r$ or immediately adjacent columns;

(f) comparing, for each rectangle, a parameter of the total image represented by the pixels of a defined logic state, contained in this rectangle, with a theoretical, nominal parameter of a bar code bar which would be pointed essentially in the direction of the columns of the rectangle;

(g) giving a binary electrical signal of a first logic state or a second logic state as a function of the result of the comparison, said signal representing the presence or absence of a bar.

The invention therefore consists in the elimination of certain image zones from the processed block, and in the preserving of only rectangular blocks having a high probability of containing essentially a bar of a bar code; this probability is determined from the columnwise counting of the pixels of the block. Then a certain operation of shape recognition is performed on selected rectangular blocks, in no longer taking any account of the other blocks. The recognition is done by comparing the image stored in each block with a theoretical image of a strip in the application considered. A parameter of the comparison may be the black surface contained in the rectangular block. It may also be the height, the position of a center of gravity or barycenter of the image. It may also be a combination of these different parameters. A coefficient of resemblance is established between the real image in the block and the theoretical image. This coefficient depends on several parameters. The recognition signal is set up in comparison with a minimum value chosen.

According to a major characteristic of the invention, the value SDA, used to determine the limits of the blocks to be preserved, could be defined by a sequence of recurrent operations which are as follows:

(c1) a first whole number SD is chosen, which is at least equal to 1;

(c2) in making j increase, a sequence of values XA1, XA2, ..., Xar etc., of j is determined for which Tj crosses the threshold SD in a first direction, and a sequence of values XB1, XB2, ..., XBr etc. is defined for which Tj crosses the threshold in the other direction;

(c3) for each of the pairs XAr, XBr, a value is computed which is the ratio between the quantity (XBr-XAr).SD and the quantity which is the summation of [Tj−SD]for j varying by XAr to XBr;

(c4) this ratio is compared with a minimum chosen ratio;

(c5) SD is incremented by one unit if one of the ratios is smaller than the minimum ratio chosen, and the steps c2 to c5 are started again;

(c6) the incrementation is stopped if the ratios computed for each of the pairs XAr, XBr all exceed the minimum ratio; the indices XAr, XBr corresponding to the last computation made are memorized, and the value SDA is the last value of SD used in this recurrent computation.

According to another major characteristic of the invention, the initial value of SD chosen to start the recurrent computation is obtained by:

computing the total number of pixels in the first binary logic state for the entire matrix;

computing the ratio between this number and the number of pixels existing in a column of the matrix;

multiplying this ratio by a coefficient, and choosing a whole number close to the result to obtain the initial value of SD.

This computation of the initial value of SD is quite simply aimed at reducing the number of recurrent operations to establish the value of SDA; but it would be quite possible to start with SD=1. The above computation makes it possible to establish an initial value of SD which is related to the variable density of pixels in a given logic state. In other words, an initial value of SD will be adopted, which will be all the higher as there are more "black" pixels (for black bars on a white background) in the matrix studied.

With regard to the defining of the pairs XAr, XBr, for which the sum of Tj pixels, computed column by column, crosses the threshold SD in one direction and then in another, the preferred approach according to the invention is the following one:

XAr is the value of j for which, in making j increase, Tj becomes greater than or equal to SD whereas Tj was previously (for j=XAr−1) strictly smaller than SD.

XBr is the first value of j for which, in making j increase from XAr, Tj is still greater than or equal to SD, whereas for the following column (j=XBr+1), Tj again becomes strictly smaller than SD.

However, alternative ways of defining XAr and XBr could be provided for without going beyond the scope of the invention. For example, XAr could be a value for which Tj becomes strictly greater than SD, or it could be value of the abscissa of the column which immediately precedes the column for which Tj becomes greater than or equal to SD. Similarly, XBr may be the first value of j for which Tj again becomes strictly smaller than SD, or for which Tj again becomes smaller than or equal to SD.

These alternatives affect the choice of decision thresholds for the computation of SDA in particular: in a generic formulation, it shall be assumed that the expression "Tj crosses the threshold Tj", either in one direction or in the other, covers these different alternatives.

BRIEF DESCRIPTION OF THE DRAWINGS

Other features and advantages of the invention will appear from the following detailed description, made with reference to the appended drawings, of which:

FIG. 1 shows a schematic view of a device for reading indexing marks in the form of bar codes;

FIG. 2 shows a digitalized image, in the form of a matrix of binary pixels, containing black surfaces which could be bars of bar codes, as well as a curve $Tj = f(j)$ representing the sum of black pixels of each column j of the matrix of FIG. 1; this figure also shows hachured surfaces above and below a threshold SD;

FIG. 3 shows the curve $Tj=f(j)$ with hachured surfaces above and, below another threshold SD1;

FIG. 4 shows the curve $Tj=f(j)$ with hachured surfaces above and below another threshold SD2;

FIG. 5 shows the image matrix of FIG. 2, after the elimination of certain portions which are not likely to contain bars of bar codes.

DESCRIPTION OF A PREFERRED EMBODIMENT

FIG. 1 shows a simple example of a bar code printed on a sheet. The bars are rectangular strips with a nominal height H, a nominal width 1 and a nominal spacing P. The code is defined by the real spacing E between axes of adjacent strips, this spacing being a whole number multiple of the pitch P, to within the nearest positioning tolerances. Consequently, the basic reading principle consists in determining if there is a strip or not at the different possible positions, these positions being spaced out from one another by the distance P.

An optical detector 10, preferably consisting of a linear array of photodiodes, is placed in uniform motion before the surface carrying the bar code.

In the prior art, all that was done was to observe absorption spikes (for black strips on white background) or reflecting spikes (for reflecting strips on low-reflective background) and to deduce, therefrom, the presence or absence of strips depending on whether or not the spike exceeded a defined threshold.

In the present invention, a matrix image shall be formed of the surface (or portion of a surface) carrying the marks, this image shall be given a particular signal processing operation to demarcate zones with high probability of the presence of a strip, and then the image contained in these zones shall be compared with a typical image of a strip.

The processing and recognition circuit is represented schematically by a block 12 in FIG. 1.

The matrix image of a surface zone 14 is given by the optical detector 10 which may be a matrix or linear photosensor camera. If it is a linear photosensor, the image of the zone 14 will be given as and when the detector moves along the zone 14.

The image of each dot is converted into a pixel or a 0 or 1 information bit representing the fact that the surface of this dot is rather reflective or rather absorbent. The dots examined on the surface 14 are closer to one another or more distant from one another, depending on the resolution of the optical detector. The resolution in the vertical direction is not necessarily the same as in the horizontal direction. Here, a higher resolution is preferred in the horizontal direction, i.e. crosswise to the bars.

The overall image of the zone 14 is stored in a matrix memory with n rows and p columns. It is also possible to store an image of the entire marked surface and to process this complete image, but the sub-division into several successively examined zones enables faster processing of the image.

The first signal processing stage, namely the stage I, consists in segmenting the image into significant zones having a high probability of containing a strip. The purpose of this stage is, in particular, to eliminate a large portion of the zones having undesirable spots which disturb the image and cannot be considered to be strips. Stage I will be followed by a shape-recognition stage.

Stage I takes place in two successive steps, A and B. The former is not always necessary, but is aimed at reducing the number of computations in the following step, B.

The first step A consists in defining a threshold for the start of the analysis which will be performed in the second step B. We shall return to step A after describing the step B in detail, for it is difficult to understand the significance of step A without knowing what the step B is.

Step B consists first of all in computing, for each of the p columns of the matrix, the total number of pixels in a first binary state contained in this column. In the rest of the description, it shall be assumed, solely by way of example, that the pixels are counted in the high level state (state 1) and that these pixels represent the black dots of the image.

FIG. 2 shows an example of a matrix block with an image of black dots (pixels in state 1) stored in this matrix. The black dots are hachured and the digit 1 is recorded in the square corresponding to this pixel. The white dots are neither hachured nor do they have anything recorded in them.

A computation is therefore made, if $x(i,j)$ is the value of the pixel at the intersection of the line i and the column j, of the sum $T_j$ (for each column j) of the values $x(i,j)$ for i varying from 1 to n.

A depiction of $T_j$ as a function of j is achieved. This depiction is drawn in FIG. 2, below the columns of the matrix, so that the correspondence between a column j and the total number of black pixels which it contains is clearly seen.

The values of $T_j$, along with a correspondence between each column number j and the value $T_j$ of the sum of the black pixels of this column, are memorized.

Then, a sequence of computation steps is performed. These steps take place as follows:

an initial starting value SD is set for $T_j$; the purpose of the step A, mentioned above, is to define this value, and we shall return to it further below. For the time being, it shall be assumed that SD is a relatively small whole number, greater than 1. In FIG. 2, SD=2 has been selected for a curve in which $T_j$ varies by 0 to 9.

j is made to increase from 1 to p, and the following are determined:

(a) a sequence of values XA1, XA2, ..., XAr etc., for which $T_j$ crosses the threshold SD in a first direction, for example, in the rising order direction. In FIG. 2, there are thus four columns, XA1, XA2, XA3, XA4, identified, for which $T_j$ becomes greater than or equal to SD by rising order of value in the direction of rising values of j.

(b) a sequence of values XB1, XB2, ..., XBr, etc., for which $T_j$ crosses the threshold SD in the other direction. In FIG. 2, there are four values identified, XB1, XB2, XB3, XB4, for which $T_j$ is again greater than or equal to SD but shall be strictly smaller than SD at the following column in the direction of the rising order of values of j.

a computation is then made, for each of the pairs XAr, XBr, of a ratio which is the ratio between two surfaces of the curve $T_j$, as a function of j. FIG. 2 shows these two surfaces in the form of hachured zones in different directions. The first surface, called Sinf1, for the first pair XA1, XB1, then Sinf2 for the second pair XA2, XB2 etc., is the surface demarcated by the curve $T_j$, between the abscissae defined by the pair considered, below the threshold SD. The second surface, called Ssup1 for the first pair XA1, XB1, then Ssup2 for the pair XA2, XB2 etc., is the surface defined by the curve $T_j$, between the abscissae defined by the pair considered, above the threshold SD. The surfaces Sinf are expressed in the form (XBr−XAr).SD; the surfaces Ssup are expressed as the sum of $(T_j-SD)$ for j varying from XAr to XBr.

the ratios of the lower and upper surfaces for each of the pairs are compared with a chosen value, if the ratio is smaller than the chosen value for at least one pair XAr, XBr, the value SD is incremented by one unit and the ratio computations are started again; if the ratio is greater than the chosen value for all the pairs, then the last values of XAr and XBr for which the computation has been made are memorized; these are the values that will be used to define zones with high probability of the presence of a strip.

A step-by-step description shall now be given of the recurrent computation made on the matrix of dots and the curve of FIG. 2, with the digital values given on the drawing. Of course, this example is given purely by way of example for a better understanding of the invention.

1. First step of the recurrent computation

The computation starts with SD=2. From the very first column (XA=1) onwards, the sum of black pixels is greater than 2. Then it goes to 3 in the following column, and this column (XB=2) is the last column before the sum returns to a value which is strictly below 2; the other pairs of columns for which the threshold SD is crossed are the following:

XA2=5 for which $T_j$ goes to 4
XB2=8 for which $T_j$ is equal to 4 before dropping back to 1.
XA3=11 for which $T_j$ goes to 4
XB3=13 for which $T_j$ is still equal to 2 before dropping back to 0.
XA4=15 for which $T_j$ goes to 3
XB4=15 (this is the same column as XA4) since, from the 16th column onwards, $T_j$ drops back to 1.

The different lower and upper surfaces are then computed above and below the line defined by SD=2.

Sinf1=4 between the columns XA1 and XB1 beneath SD=2.
Ssup1=1 between the columns XA1 and XB1 above SD=2.

their ratio R1=Sinf1/Ssup1 is equal to 4.
Sinf2=8 between the columns XA2 and XB2 beneath SD=2.
Ssup2=14 above SD=2.

R2=Sinf1/Ssup1=0.57.
Sinf3=6
Ssup3=12
R3=0.5

Sinf4=2
Ssup4=1
R4=2

The surface ratios are spread out at intervals between 0.5 and 4. It will be considered that the computation stopping threshold is 1 in this example. Clearly, certain ratios are smaller than 1. It is concluded therefrom that SD must be incremented by one unit and that the defining operation should be repeated for the pairs of columns XAr, XBr for which Tj again crosses the new threshold SD1=3.

2. Second step of the recurrent computation

FIG. 3 shows the curve Tj as a function of j with the new threshold SD1=3, the new pairs of columns for which Tj crosses the new threshold and the new hachured lower and upper surfaces which result therefrom and which have the same definition as previously.

In the example studied numerically herein, the following new pairs of columns are found:

| XA1 = 2 | XA2 = 5 | XA3 = 11 | XA4 = 15 |
|---|---|---|---|
| XB1 = 2 | XB2 = 8 | XB3 = 12 | XB4 = 15 | and the following lower and upper surfaces:

| Sinf1 = 2 | Sinf2 = 12 | Sinf3 = 6 | Sinf4 = 3 |
|---|---|---|---|
| Ssup1 = 0 | Ssup2 = 10 | Ssup3 = 10 | Ssup4 = 0 | hence the ratios:

| R1 infinite | R2 = 1.2 | R3 = 0.6 | R4 = infinite |
|---|---|---|---|

If these ratios are compared with the chosen threshold, which in this case is one, it is seen that only one ratio remains below this threshold. The computation must therefore be started again, in incrementing the threshold SD1 by one unit. This threshold SD1 now becomes SD2=4.

3. Third step of the recurrent computation

FIG. 4 again shows the function Tj of the sum of black pixels of the matrix considered by way of example. The threshold SD2=4 enables the defining of new abscissae XAr of columns for which Tj crosses the threshold SD2 in rising order (in the direction of the rising order of values of j) and of new abscissae XBr for which, again in the rising order direction of values of j, Tj again crosses the threshold SD2, this time in descending order. Here again, more precisely, the abscissae XBr are defined as the last column for which Tj is greater than or equal to SD2 before falling strictly below this value.

The following new pairs of columns are found:

| XA1 = 5 | XA2 = 11 |
|---|---|
| XB2 = 8 | XB2 = 12 |
| Sinf1 = 16 | Sinf2 = 8 |
| Ssup2 = 6 | Ssup2 = 8 |
| R1 = 2.67 | R2 = 1 |

The surface ratios are now all greater than or equal to 1, that is, the value adopted to end the recurrent computation.

The incrementation of SD is thus stopped, and the last value SD2 represents the value SDA such that the columns for which Tj is smaller than SDA are not considered to be columns probably containing a bar of a bar code.

Then, the last pairs of abscissae XAr, XBr for which the recurrent computation has been done, i.e. for which Tj crosses the threshold SDA in one direction and then in the other, are memorized.

Then the columns for which Tj is smaller than SDA are removed from the matrix of pixels of FIG. 2. This amounts to demarcating blocks of pixels, each block consisting of several adjacent columns of the matrix and each capable of containing a bar of a bar code.

Each block is bounded on one side by a column XAr and, on the other side, by the column XBr corresponding to the same index r.

In principle, the block includes both the column XAr and the column XBr at the same time, without going any further than this. However, it is possible to contemplate alternatives wherein each block includes either the column immediately preceding the column XAr or the column immediately after XBr, or both. It is also possible to think of alternatives wherein the block is bounded by the columns XAr and XBr without including any one of these two columns or without including either of these two columns. The value of the minimal ratio of surfaces, Sinf/Ssup, used in the recurrent computation to define SDA, depends on the alternative chosen and, above all, on the application considered. It may be chosen intuitively or following real experiments in the application. It has also been chosen as being equal to 1 in the example described with reference to FIG. 2.

FIG. 5 represents the matrix of pixels of the block of FIG. 2 in which only the pixels of blocks bounded by the columns XAr, XBr have been preserved. It is inside these blocks that it will be decided whether or not there is a bar of a bar code.

Stage I, which is the stage for the segmentation of the image into blocks with high probability of the presence of a bar, is now completed.

However, step A of this stage I remains to be specified. This step A is the step for defining a starting threshold SD for the recurrent computation of the step B. Rather than performing the recurrent computation from SD=1, it is preferred to eliminate superfluous steps for which it is practically certain that the surface ratios Sinf/Ssup will be smaller than the chosen value.

According to a particular characteristic of the invention, during a step A preceding the step B, an initial value of SD is computed as follows:

the total number of pixels in a first binary state for the entire matrix image is counted: this is the sum of the values of Tj for j varying from 1 to p.

this sum is multiplied by a pre-defined number K (in practice, the greater the number p of columns of the matrix, the smaller is this number K, so that the number K can be written in the form K=k/p).

and a whole number, close to the result of this multiplication, is chosen. This number is, for example, the closest number of a higher value or a lower value, and it constitutes the starting value SD for the recurrent computation.

In a digital example corresponding to that of FIG. 2, the number p is 16. The coefficient k chosen (on the basis of intuitive or experimental considerations related to the application considered) is ½. K is therefore equal to 1/32. The total number of pixels having the logic state 1 in the matrix is 52. The result of the multiplication is 1.63. The closest whole number, namely SD=2, is chosen for SD.

In another digital example with a matrix of 64 rows by 64 columns, in which there would be 550 black pixels, there would be, with the same coefficient k=½, a starting threshold SD=4, below which it is not necessary to perform the recurrent computation.

As for the stage II of the bar detection operation, it consists, as already stated, in a shape-recognition stage designed to check whether the presence of a relatively large number of black dots inside the blocks selected in the stage I corresponds or not to a bar of the code.

This level of sophistication of this recognition process may vary, and so may the strictness with which the zones recognized as being bars are selected.

In one example, which is simplified to the utmost degree, the recognition may consist solely in an overall assessment of the black surface inside each of the selected blocks and in a comparison of this surface with a nominal bar surface in the application considered, or with a range of normal, permissible values. The black surface is assessed by a simple summation of Tj between the limits XAr and XBr of a block.

In the example of FIG. 2, processed to arrive at the FIG. 5, the black surface in the first block between XA1 and XB1 is equal to 22. In the second block, it is 13. It can be assumed that a bar is recognized as such if the surface is at least equal to 10 black pixels and, in this case, there will be two bars recognized in the image of FIG. 2 while the other black pixels could be considered as noise eliminated by the processing method of the present invention.

In a more complex example of shape recognition, in addition to computing the total black surface in a block, it is possible to compute the height of the black image in the block if this block does not occupy the entire height of the block and to make a comparison with a nominal bar height or a range of nominal heights which are acceptable.

Preferably, these comparisons are made after supplementary signal processing consisting in the elimination, in the selected blocks, of the isolated black pixels, namely those which, inside a block, do not have any immediate neighbor, on the same row or on the same column (or, possibly, also diagonally). For, these isolated pixels can be considered as noise. In certain cases, it is even possible to eliminate small, isolated groups.

It is also possible to envisage specifying the recognition criteria by assessing the position of a barycenter of the surface of black pixels of a block, and by comparing this position with a nominal position or with a range of permissible nominal positions for a bar code. The barycenter may be defined as being the point for which the sum of squares of the distances between this point and each of the points of the block is the minimum.

In general, there could be established a coefficient of resemblance which represents, in relative values, the proximity between the real values and nominal values of different parameters including those which have been cited above. If the relative differences in percentage are E1, E2, E3 for three parameters, the coefficient of resemblance expressed in percentage could be:

$$CR(\%) = 100 - (E1 + E2 + E3)/3$$

This coefficient is compared with a minimum acceptable value, for example 80%. If it is greater, a binary electrical signal in a first state is given to indicate that a bar has been recognized in the considered block between two abscissae XAr and XBr. If it is lower, an electrical signal in a second state is given to indicate that the block does not really contain any bar code but unwanted black spots.

To eliminate blocks or to supplement the computation of a coefficient of resemblance by an additional parameter or, again, to help in the decoding of the code, another alternative method uses a measurement of the width of the blocks between the abscissae XAr and XBr. This measurement is compared with a nominal width or with several nominal widths (if the code becomes merged with the width of the bars) or, again, with one or more ranges of acceptable widths. Here too, the coefficient of resemblance could be computed from the mean of relative differences in percentage of the different parameters with respect to their nominal values.

What is claimed is:

1. A method for the optical reading of bar codes, comprising the following sequence of processing operations:
    (a) providing, by means of an optical detector, a representation of a zone containing the bar code, in the form of a matrix of pixels in which each pixel represents a binary logic state characteristic of a dot of the zone;
    (b) computing the total Tj of the number of pixels in a first logic state for each column of the matrix, j being the column index of the matrix;
    (c) establishing a value SDA such that the columns for which Tj is below SDA are not considered as probably containing a bar of the bar code;
    (d) determining, by making j increase, a sequence of abscissae of columns XA1, XA2, . . ., XAr etc., for which Tj crosses the value SDA in a first direction and a sequence of abscissae of columns XB1, XB2. . . . XBR, etc. for which Tj crosses the value SDA in the other direction;
    (e) demarcating, in the matrix of pixels, for each index r, a rectangle having, as its sides, the columns of abscissae XAr, XBr or immediately adjacent columns;
    (f) comparing, for each rectangle, a parameter of the total image represented by the pixels of a defined logic state, contained in this rectangle, with a theoretical, nominal parameter of a bar code bar which would be pointed essentially in the direction of the columns of the rectangle;

(g) giving a binary electrical signal of a first logic state or a second logic state as a function of the result of the comparison, said signal representing the presence or absence of a bar.

2. An optical reading method according to claim 1, wherein the value SDA of the step c is determined by a sequence of recurrent operations which are as follows:

(c1) a first whole number SD is chosen, which is at least equal to 1;

(c2) in making j increase, a sequence of values XA1, XA2, ..., Xar etc., of j is determined for which Tj crosses the threshold SD in a first direction, and a sequence of values XB1, XB2, ..., XBr etc. is defined for which TJ crosses the threshold in the other direction;

(c3) for each of the pairs XAr, XBr, a value is computed which is the ratio between the quantity (XBr−XAr).SD and the quantity which is the summation of [Tj−SD] for j varying by XAr to XBr;

(c4) this ratio is compared with a minimum chosen ratio;

(c5) SD is incremented by one unit if one of the ratios is smaller than the minimum ratio chosen, and the steps c2 to c5 are started again;

(c6) the incrementation is stopped if the ratios computed for each of the pairs XAr, XBr all exceed the minimum ratio; the indices XAr, XBr corresponding to the last computation made are memorized, and the value SDA is the last value of SD used in this recurrent computation.

3. An optical reading method according to claim 2, wherein the initial value of SD chosen in the step c1 to start the recurrent computation is obtained by:

computing the total number of pixels in the first binary logic state for the entire matrix;

computing the ratio between this number and the number of pixels existing in a column of the matrix;

computing the ratio between this number and the number of pixels existing in a column of the matrix; multiplying this ratio by a coefficient, and choosing a whole number close to the result to obtain the initial value of SD.

4. An optical reading method according to one of the claims 1 to 3, wherein the defining of the pairs XAr, XBr, for which the sum of Tj pixels, computed column by column, crosses the threshold SD in one direction and then in another, is as follows:

XAr is the value of j for which, in making j increase, Tj become greater than or equal to SD whereas Tj was previously (for j=XAr−1) strictly smaller than SD;

XBr is the first value of j for which, in making j increase from XAr, Tj is still greater than or equal to SD whereas, for the following column (j=XBr+1), Tj again becomes strictly smaller than SD.

5. An optical reading method according to any one of the claims 1 to 3 wherein, in the step f, several different parameters are assessed for the image contained in each rectangle and are compared with a nominal parameter, and wherein the electrical signal given at the step g is a function of all these comparisons.

6. An optical reading method according to any one of the claims 1 to 3, wherein the parameter assessed at the step f comprises one or more of the following parameters: overall surface of the image in the rectangle; height of this image; width of this image; position of the barycenter of the image.

7. An optical reading method according to any one of the claims 1 to 5, wherein the parameter assessed at the step f is a coefficient of resemblance between the image contained in the rectangle and the theoretical image of a bar of a bar code, said coefficient being a function of one or more of the following magnitudes: overall surface of the image in the rectangle; height of this image; width of this image; position of the barycenter of the image.

8. A reading method according to claim 7, wherein the coefficient of resemblance is a function of the mean of the differences between the magnitudes considered and the nominal values of these magnitudes.

* * * * *